US008135902B2

(12) United States Patent  
Kurashige (10) Patent No.: US 8,135,902 B2  
(45) Date of Patent: Mar. 13, 2012

(54) NONVOLATILE SEMICONDUCTOR MEMORY DRIVE, INFORMATION PROCESSING APPARATUS AND MANAGEMENT METHOD OF STORAGE AREA IN NONVOLATILE SEMICONDUCTOR MEMORY DRIVE

(75) Inventor: Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/546,532

(22) Filed: Aug. 24, 2009

(65) Prior Publication Data

US 2010/0161884 A1 Jun. 24, 2010

(30) Foreign Application Priority Data

Dec. 24, 2008 (JP) ................................. 2008-328073

(51) Int. Cl.
*G06F 13/00* (2006.01)
*G06F 13/28* (2006.01)

(52) U.S. Cl. ....................................................... 711/103

(58) Field of Classification Search .................... 711/103
See application file for complete search history.

(56) References Cited

U.S. PATENT DOCUMENTS

| 5,341,339 | A |   | 8/1994 | Wells |  |
|---|---|---|---|---|---|
| 5,630,093 | A |   | 5/1997 | Holzhammer et al. |  |
| 5,652,857 | A |   | 7/1997 | Shimoi et al. |  |
| 5,675,789 | A | * | 10/1997 | Ishii et al. | 1/1 |
| 5,860,124 | A | * | 1/1999 | Matthews et al. | 711/165 |
| 2004/0030847 | A1 | * | 2/2004 | Tremaine | 711/154 |
| 2004/0250011 | A1 |   | 12/2004 | Chen et al. |  |
| 2008/0172525 | A1 |   | 7/2008 | Nakamura et al. |  |
| 2009/0138671 | A1 | * | 5/2009 | Danilak | 711/170 |
| 2009/0172248 | A1 | * | 7/2009 | You | 711/103 |

FOREIGN PATENT DOCUMENTS

| JP | 6-202921 | 7/1994 |
| JP | 6-223591 | 8/1994 |
| JP | 08-249159 | 9/1996 |
| JP | 9-231109 | 9/1997 |
| JP | 3195988 | 8/2001 |
| JP | 2004-362534 | 12/2004 |
| JP | 2005-327625 | 11/2005 |

(Continued)

OTHER PUBLICATIONS

Kjelso, Morten, "Memory Management in Flash-Memory Disks with Data Compression", 1994.*

Yehua Du et al.; "Adaptive Garbage Collection Mechanism for N-log Block Flash Memory Storage Systems"; The 16th International Conference on Artificial Reality and Telexistence, ICAT 2006, Hangzhou China Nov. 29-Dec. 1, 2006, pp. 532-535.

(Continued)

*Primary Examiner* — Edward Dudek, Jr.
(74) *Attorney, Agent, or Firm* — Blakely, Sokoloff, Taylor & Zafman LLP (57) ABSTRACT

According to one embodiment, a nonvolatile semiconductor memory drive includes a nonvolatile semiconductor memory, and a controller which controls a process of writing and reading data with respect to the nonvolatile semiconductor memory. The controller includes a compaction control module which acquires free groups set in an unused state by rearranging valid data scattered in n groups in groups of a number not larger than n−1 when the number of free groups remaining in a plurality of groups formed as a storage area management unit of the nonvolatile semiconductor memory becomes not larger than a predetermined number, and a compression control module which acquires free groups by compressing stored data in m groups in which access to stored valid data has not been made for a period longer than a predetermined period and rearranging the compressed data in groups of a number not larger than m−1.

6 Claims, 7 Drawing Sheets

FOREIGN PATENT DOCUMENTS

| | | |
|---|---|---|
| JP | 2005-535051 | 11/2005 |
| JP | 2007-242554 | 9/2007 |
| JP | 2008-171312 | 7/2008 |
| WO | WO 9637846 A1 * | 11/1996 |
| WO | WO 2007019198 | 2/2007 |

OTHER PUBLICATIONS

Japanese Patent Application No. 2010-024153, Notification of Reasons for Rejection, mailed Oct. 25, 2011, (English Translation).

* cited by examiner

NONVOLATILE SEMICONDUCTOR MEMORY DRIVE, INFORMATION PROCESSING APPARATUS AND MANAGEMENT METHOD OF STORAGE AREA IN NONVOLATILE SEMICONDUCTOR MEMORY DRIVE

CROSS-REFERENCE TO RELATED APPLICATIONS

This application is based upon and claims the benefit of priority from Japanese Patent Application No. 2008-328073, filed Dec. 24, 2008, the entire contents of which are incorporated herein by reference.

BACKGROUND

1. Field

One embodiment of the invention relates to a management technique for a storage area to enhance data write efficiency in a nonvolatile semiconductor memory drive such as a solid-state drive (SSD), for example.

2. Description of the Related Art

Recently, portable, battery-driven notebook personal computers called mobile PCs have become popular. In most personal computers of this type, a wireless communication function is provided or a wireless communication function can be added as required by connecting a wireless communication module to a universal serial bus (USB) connector or inserting such a module into a PC card slot. Therefore, if the user carries the mobile PC with him, he can create and send documents or acquire various kinds of information at any location or while on the move.

Further, since it is required that a personal computer of this type be portable, highly shock-resistant and usable for long periods when powered by battery, research into ways to make devices smaller and lighter, enhance shock-resistance and reduce power consumption is in progress. Against this background, mobile note PCs incorporating flash-memory-based SSDs instead of hard disk drives (HDDs) have recently begun to be manufactured and sold.

For a device using a flash memory, various mechanisms for adequately managing storage areas to maintain data write efficiency have been proposed (for example, see Japanese Patent Publication No. 3195988).

As a storage area management method for maintaining the data write efficiency, compaction is well known. When it is assumed that a plurality of groups are constructed as a storage area management unit, compaction is a process of selecting, for example, two groups in which the capacity of invalid data (that occurs when data is updated at the additional write time) is increased, putting valid data of the two groups into one group and resetting one group to an unused state. The data write efficiency can be maintained by appropriately performing the compaction process to securely acquire a free group in the unused state.

Generally, the compaction process is performed when the number of free groups becomes less than or equal to a reference value. Therefore, if a new mechanism for securely attaining the number of free groups is provided, the opportunity of performing the compaction process itself can be suppressed and the data write efficiency can be maintained more securely.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a nonvolatile semiconductor memory drive includes a nonvolatile semiconductor memory, and a controller which controls a process of writing and reading data with respect to the nonvolatile semiconductor memory. The controller includes a compaction control module which acquires free groups set in an unused state by rearranging valid data scattered in n groups in groups of a number not larger than n−1 when the number of free groups remaining in a plurality of groups formed as a storage area management unit of the nonvolatile semiconductor memory becomes not larger than a predetermined number, and a compression control module which acquires free groups by compressing stored data in m groups in which access to stored valid data has not been made for a period longer than a predetermined period and rearranging the compressed data in groups of a number not larger than m−1.

Figure 1:
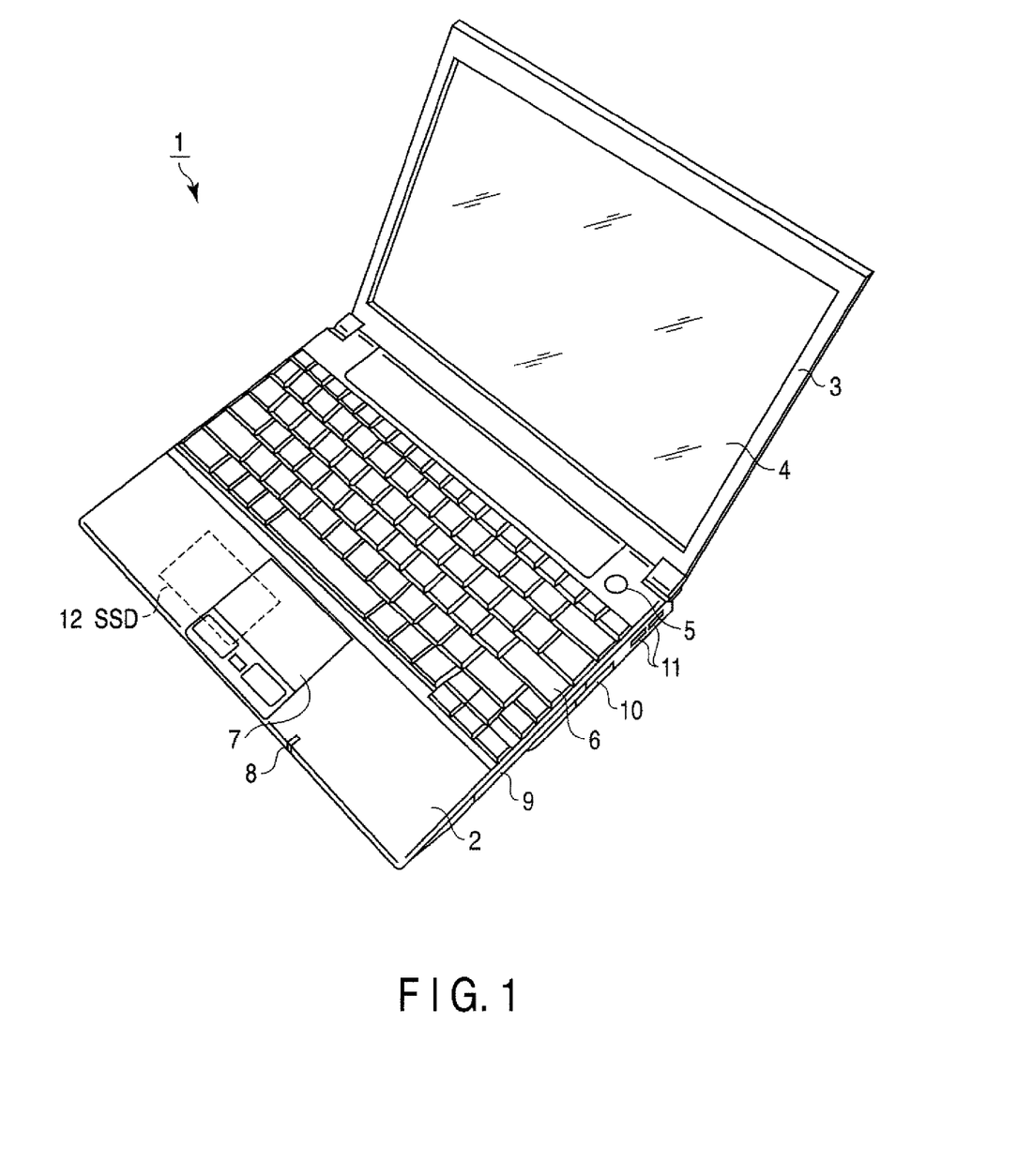
FIG. 1 is an exemplary view showing an external appearance of an information processing apparatus (computer) according to an embodiment of the invention.

FIG. 1 is an exemplary view showing the external appearance of an information processing apparatus according to this embodiment. For example, the information processing apparatus is realized as a notebook personal computer 1 that can be battery-driven and is called a mobile note PC.

The computer 1 includes a computer main body 2 and display unit 3. In the display unit 3, a display device configured by a liquid crystal display (LCD) 4 is incorporated.

The display unit 3 is rotatably installed in the computer main body 2 so as to be freely rotated between an open position in which the upper surface of the computer main body 2 is exposed and a closed position in which the upper surface of the computer main body 2 is covered with the display unit 3. The computer main body 2 is formed of a thin box-form casing and a power source switch 5, keyboard 6, touchpad 7 and the like are arranged on the upper surface thereof.

Further, a light-emitting diode (LED) 8 is arranged on the front surface of the computer main body 2 and an optical disc drive (ODD) 9 that can write and read data with respect to a Digital Versatile Disc (DVD) or the like, a PC card slot 10 that removably accommodates a PC card, a USB connector 11 used for connection with a USS device and the like are arranged on the right-side surface thereof. The computer 1 includes an SSD 12 that is a nonvolatile semiconductor memory drive provided in the computer main body 2 as an external storage device used as a boot drive.

Figure 2:
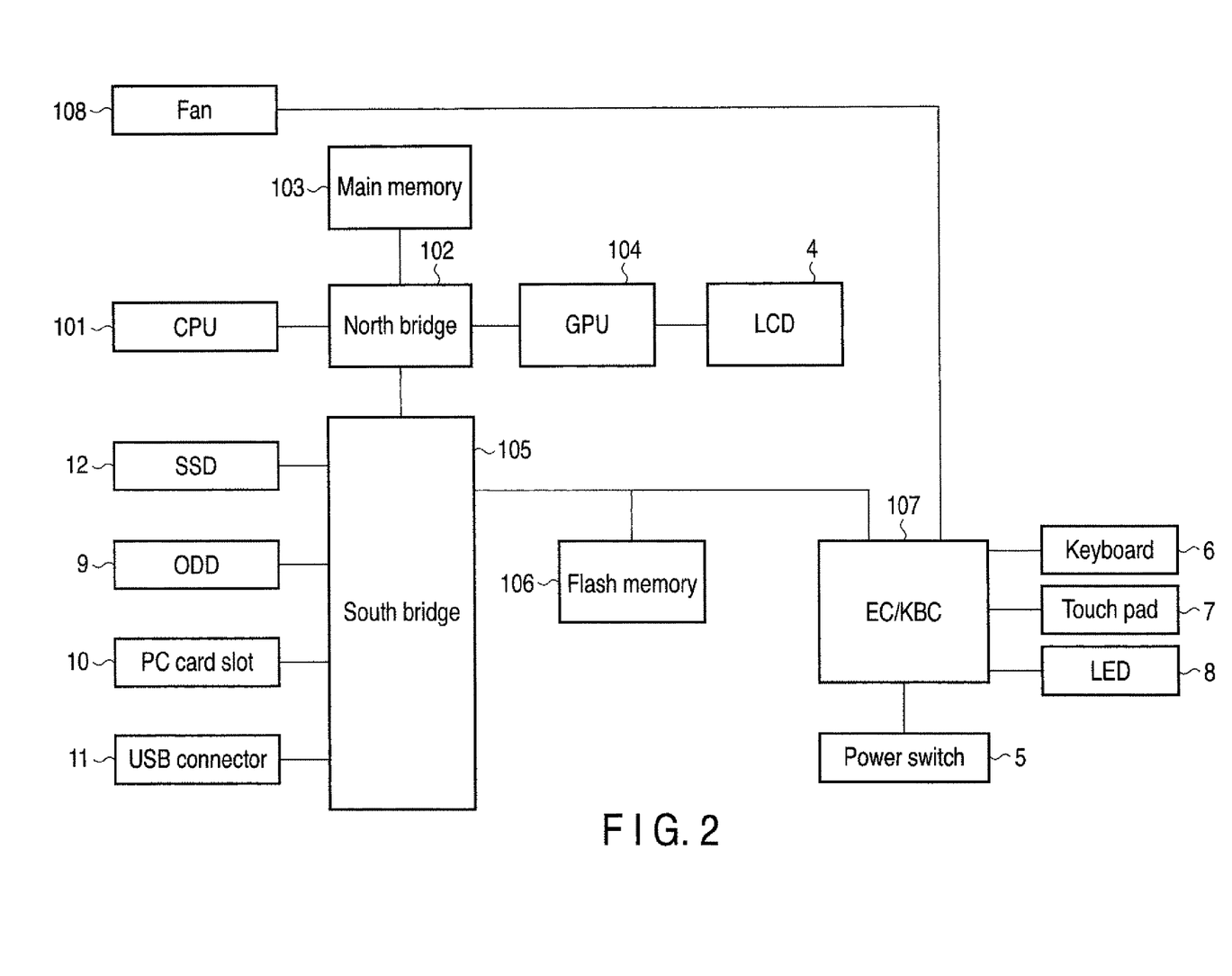
FIG. 2 is an exemplary diagram showing a system configuration of the computer of the embodiment.

FIG. 2 is an exemplary diagram showing the system configuration of the computer 1.

As shown in FIG. 2, the computer 1 includes a CPU 101, north bridge 102, main memory 103, graphic processing unit (GPU) 104, south bridge 105, flash memory 106, embedded controller/keyboard controller (EC/KBC) 107 and fan 108 in addition to the LCD 4, power source switch 5, keyboard 6, touchpad 7, LED 8, ODD 9, PC card slot 10, USB connector 11 and SSD 12.

The CPU 101 is a processor that controls the operation of the computer 1 and executes an operating system and various application programs containing utilities loaded from the SSD 12 to the main memory 103. Further, the CPU 101 also executes a basic input/output system (BIOS) stored in the flash memory 106. The BIOS is a program for hardware control.

The north bridge 102 is a bridge device that connects the local bus of the CPU 101 to the south bridge 105. The north bridge 102 includes a function of making communication with the GPU 104 via the bus and contains a memory controller that controls access to the main memory 103. The GPU 104 controls the LCD 4 used as the display device of the computer 1.

The south bridge 105 is a controller that controls various devices such as PC cards loaded in the SSD 12, ODD 9 and PC card slot 10, a USE device connected to the USB connector 11 and the flash memory 106.

The EC/KBC 107 is an one-chip microcomputer in which a built-in controller for power management and a keyboard controller for controlling the keyboard 6 and touchpad 7 are integrated. The EC/KEC 107 also controls the LED 8 and the fan 108 for cooling.

Figure 3:
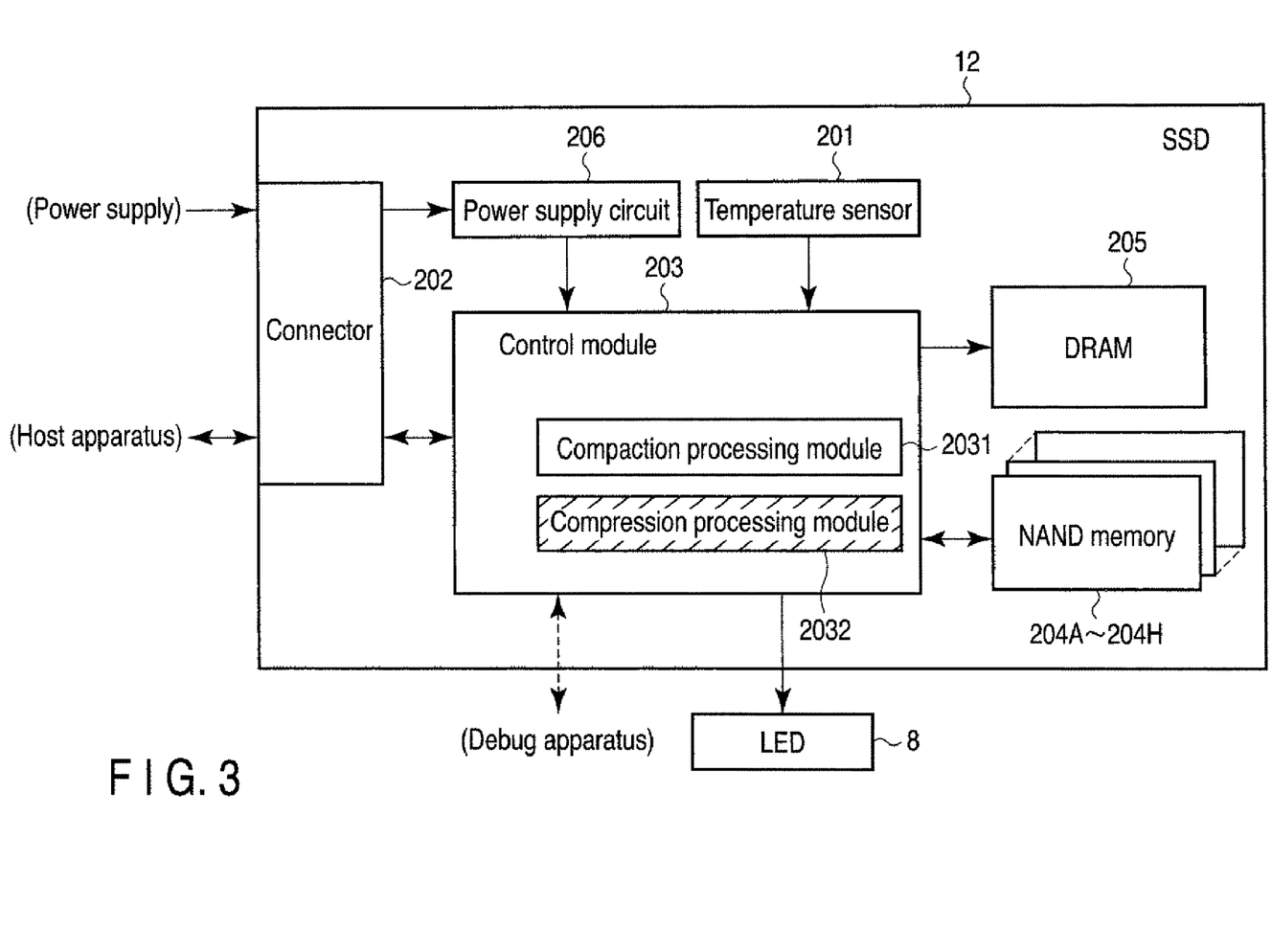
FIG. 3 is an exemplary block diagram showing the schematic configuration of an SSD installed as a boot drive in the computer of the above embodiment.

FIG. 3 is an exemplary block diagram showing the schematic configuration of the SSD 12 installed as an external storage device used as a boot drive of the computer 1 with the above system configuration.

As shown in FIG. 3, the SSD 12 is a nonvolatile external storage device that includes a temperature sensor 201, connector 202, control module 203, NAND memories 204A to 204H, DRAM 205 and power supply circuit 206 and in which data can be kept held even if the power supply is interrupted (data containing programs in the NAND memories 204A to 204H is not lost). Further, the SSD 12 is an external storage device of low power consumption that does not have a driving mechanism for a head and disk unlike the HDD and is highly shock-resistant.

The control module 203 that controls the data write and read operation with respect to the NAND memories 204A to 204H as a memory controller is connected to the connector 202, NAND memories 204A to 204k, DRAM 205 and power supply circuit 206. When the SSD 12 is mounted within the computer main body 2, the control module 203 is connected to the host apparatus, that is, the south bridge 105 of the computer main body 2 via the connector 202. Further, when the SSD 12 is provided in a singular form, the control module 203 can be connected to a debug device via a serial interface of, for example, the RS-232C standard as required.

As shown in FIG. 3, the control module 203 includes a compaction processing module 2031 and compression processing module 2032 that will be described later.

Each of the NAND memories 204A to 204H is a nonvolatile semiconductor memory including 16-Gbyte storage capacity, for example, and is a multi level cell (MLC)-NAND memory that can store two bits in each memory cell, for example. Generally, in the MLC-NAND memory, the number of rewrite operations is smaller in comparison with a single level cell (SLC)-NAND memory, but it is easy to increase the storage capacity.

The DRAM 205 is a memory device used as a cache memory in which data is temporarily stored when data is written or read with respect to the NAND memories 204A to 204H by means of the control module 203. The power supply circuit 206 creates and supplies electric power used for operating the control module 203 by using the power supplied from the SC/KBC 107 via the south bridge 105 and connector 202 as electric supply power.

Figure 4:
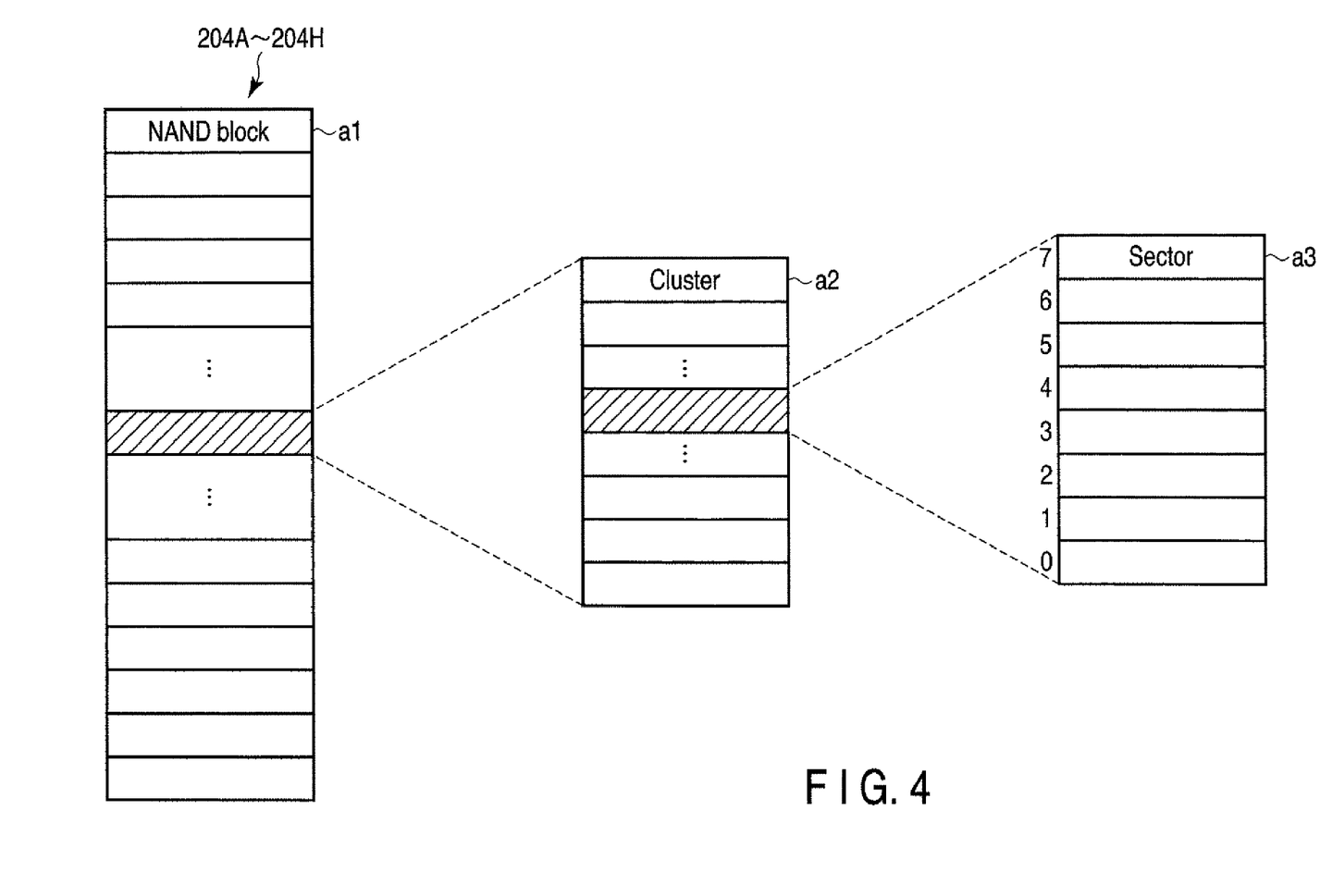
FIG. 4 is an exemplary conceptual diagram showing the schematic configuration of a NAND memory incorporated in the SSD installed in the computer of the embodiment.

FIG. 4 is an exemplary conceptual diagram showing the schematic configuration of the NAND memories 204A to 204H incorporated in the SSD 12.

In a physical address space configured by the NAND memories 204A to 204H, a sector of 512 bytes is defined as a sector "a3" used as the physical usage minimum unit and a cluster of data size formed by collecting eight sectors "a3", that is, 512 bytes×8 sectors=4,096 bytes is defined as a cluster "a2" used as the data management unit. In the SSD 12, the page size that is the physical data write unit or read unit in the NAND memories 204A to 204H is set to 4,314 bytes. That is, in the SSD 12, one cluster "a2" is stored in one page and a redundant area of 218 bytes is provided in each page (4,314 bytes−4096 bytes=218 bytes). Setting of the page size is given as only one example and it is of course possible to set the page size so as to store two or more clusters "a2" in one page.

The NAND memories 204A to 204H are each formed by a plurality of NAND blocks "a1" that can be independently operated and each NAND block "a1" is formed by 128 pages. That is, 128 clusters "a2" are stored in each NAND block twang. In the SSD 12, each NAND group is formed by 16 NAND blocks and the management of the storage area is performed by simultaneously erasing data in the NAND group (16×128=2,048 clusters) unit, for example.

Figure 5:
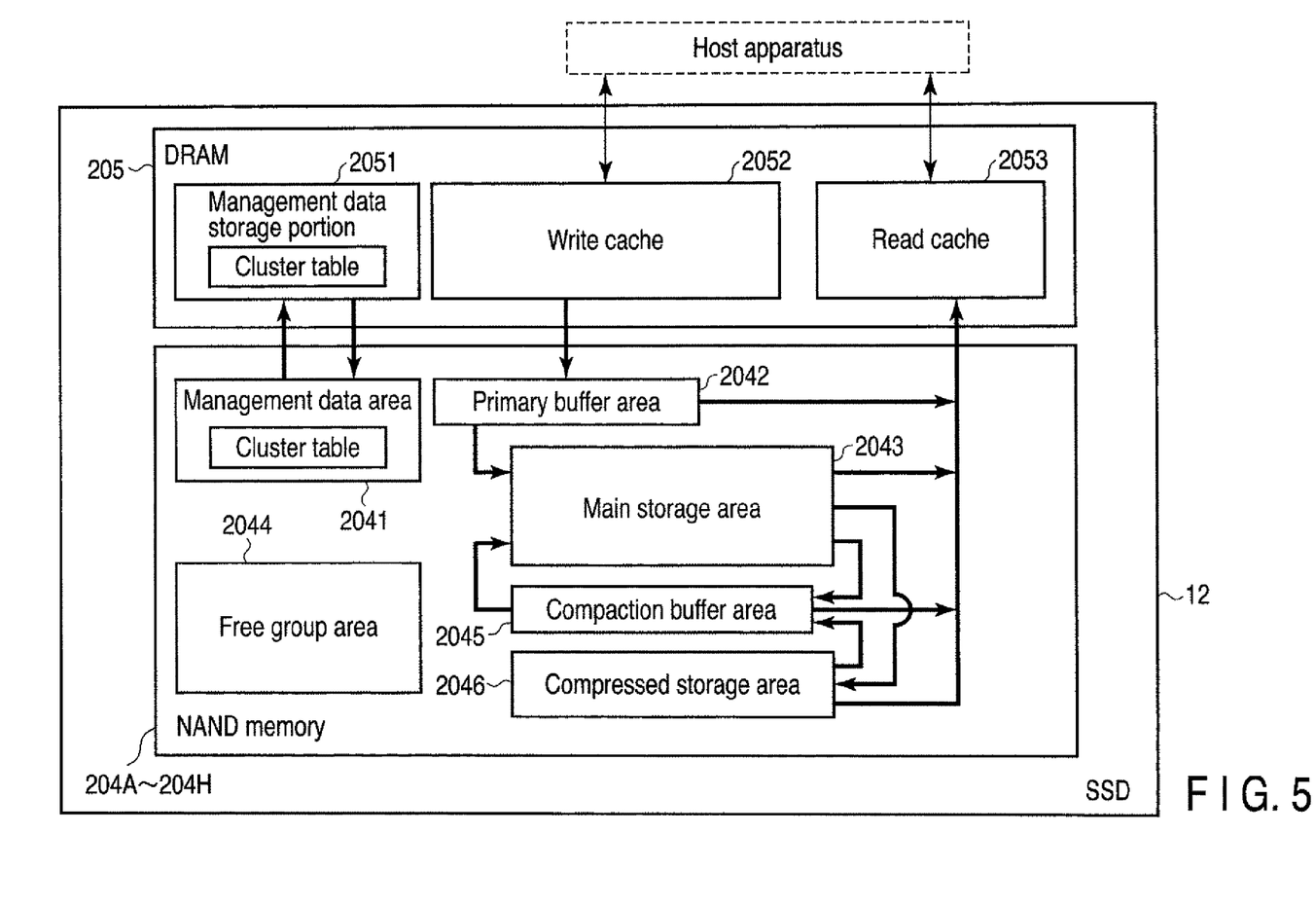
FIG. 5 is an exemplary conceptual diagram for illustrating the operation procedure of the SSD installed in the computer of the embodiment.

FIG. 5 is an exemplary conceptual diagram for illustrating the operation principle of the SSD 12.

As shown in FIG. 5, in the DRAM 205 used as a cache memory, a management data storage portion 2051, write cache 2052 and read cache 2053 are provided. Further, each storage area of the NAND memories 204A to 204H is dynamically allocated as one of a management data area 2041, primary buffer area 2042, main storage area 2043, free group area 2044, compaction buffer area 2045 and compressed storage area 2046.

The management data area 2041 is an area to store a cluster table indicating the correspondence relation between logical cluster addresses (logical block address [LBA]) and physical positions in the NAND memories 204A to 204H. The control module 203 fetches the cluster table and writes the same to the management data storage portion 2051 in the DRAM 205 when booting from the SSD 12 and accesses the NAND memories 204A to 204H by using the cluster table in the DRAM 205. For example, the cluster table in the DRAM 205 is written back to the NAND memories 204A to 204H when a predetermined command issued, for example, when shutting down the SSD 12, is received. Further, in the management data storage portion 2051 and management data area 2041, pointer information indicating write positions in the primary buffer area 2042 and compaction buffer area 2045 is stored.

When a data write request is issued from the host apparatus, the control module 203 writes the data at the write position of the primary buffer area 2042 and updates the cluster table in the DRAM 205 to set the write position in correspondence to a specified cluster address while temporarily storing the data in the write cache 2052 in the DRAM 205. If the NAND group allocated as the primary buffer area 2042 becomes full because of writing the data, the control module 203 manages matters by moving the NAND group to the main storage area 2043, and newly allocating one of the free NAND groups, which is remaining as the free group area 2044 and is set in an unused state, as the primary buffer area 2042.

The SSD 12 is a storage device of a type in which data is additionally written, data before updating is invalidated at the so-called data update time and data after update is newly written to the internal primary buffer area 2042. That is, for example, data replacement will not occur in the NAND group of the main storage area 2043. At the data update time, the control module 203 performs a process of invalidating data before update and a process of updating the cluster table caused by newly writing data after update.

On the other hand, when a data read request is issued from the host apparatus and if the data is not present in the read cache 2053 in the DRAM 205, the control module 203 acquires the position of a specified cluster address in the NAND memories 204A to 204H by referring to the cluster table in the DRAM 205, reads data stored at the above position, writes the data to the read cache 2053 and returns the data to the host apparatus. If the requested data is present in the read cache 2053, the control module 203 instantly returns the data to the host apparatus without accessing the NAND memories 204A to 204H.

In the SSD 12 that performs the data write and data read processes as described above, it is preferable that the number of free NAND groups, which is remaining as the free group area 2044 and is set in the unused state, be always kept greater than or equal to a predetermined standard number in order to maintain the data write efficiency. For this purpose, the control module 203 includes the compaction processing module 2031. When the number of free NAND groups becomes less than or equal to a predetermined number, the control module 203 performs compaction by means of the compaction processing module 2031.

First, the compaction processing module 2031 allocates one of the free NAND groups, which is remaining as the free group area 2044 and is set in the unused state, as the compaction buffer area 2045. Then, the compaction processing module 2031 selects one of the NAND groups of the main storage area 2043 which contains the least number of valid data items (valid clusters), that is, the largest number of invalidated data items (invalidated clusters) and rearranges only the valid clusters of the selected NAND group in the compaction buffer area 2045. The compaction processing module 2031 performs the process of updating the cluster table accompanied by the valid cluster rearranging process.

When all of the valid clusters in the selected NAND group have been rearranged, the NAND group is returned to the free group area 2044. Subsequently, the NAND group containing the second least number of valid clusters is selected, only the valid clusters are similarly rearranged in the compaction buffer area 2045 and then the NAND group is returned to the free group area 2044. The above process is repeatedly performed and if the NAND group allocated as the compaction buffer area 2045 becomes full, the compaction processing module 2031 shifts the NAND group to the main storage area 2043 and allocates a new free NAND group as the compaction buffer area 2045. For example, when a predetermined number of free NAND groups can be newly acquired, the compaction processing module 2031 terminates the compaction.

That is, the compaction processing module 2031 acquires n−1 free NAND groups at maximum by rearranging valid clusters scattered in n NAND groups (in an order starting from a group having the largest number of invalidated clusters) in n−1 or fewer NAND groups.

The process of performing the compaction itself may be a factor of lowering the data write efficiency in the SSD 12. Therefore, if the execution opportunity of the compaction can be suppressed, it becomes possible to maintain the data write efficiency more stably. For this purpose, the control module 203 further includes the compression processing module 2032.

In order to suppress the execution opportunity of the compaction, it is required to prevent occurrence of a state in which the number of free NAND groups becomes less than or equal to a present number as far as possible. Therefore, the control module 203 performs a data compression process by means of the compression processing module 2032 for each predetermined period, for example.

The compression processing module 2032 first allocates one of the free NAND groups, which is remaining as the free group area 2044 and is set in an unused state, as the compressed storage area 2046. Then, the compression processing module 2032 checks whether a NAND group in which access to valid data stored therein is not made for a period longer than a predetermined period is present among the NAND groups in the main storage area 2043. If a NAND group that satisfies the above condition is detected, the compression processing module 2032 compresses stored data of the NAND group in an order starting from a group that is not accessed at the latest time and rearranges stored data after compression in the compressed storage area 2046. After the rearrangement, the NAND group is returned to the free group area 2044.

If the NAND group allocated as the compressed storage area 2046 becomes full, the compression processing module 2032 allocates a new free NAND group as the compressed storage area 2046.

If the data size of stored data after compression is suppressed to approximately ⅓ or less, three NAND groups may be put into one NAND group and two NAND groups can be returned to the free group area 2044. Since the effect of compression depends on the type of stored data, the compression processing module 2032 removes the NAND group whose compression ratio is low from the object to be moved to the compressed storage area 2046.

That is, the compression processing module 2032 acquires m−1 free NAND groups at maximum by compressing stored data of m NAND groups and rearranging the same in m−1 or fewer NAND groups.

The compaction execution opportunity can be suppressed and the data write efficiency can be maintained more stably by acquiring the free NAND group by means of the compression processing module 2032.

Attribute information used for identifying whether the NAND group is a NAND group whose stored data is compressed and that is moved to the compressed storage area 2046 and pointer information indicating a write position in the compressed storage area 2046 are held by the management data storage portion 2051 in the DRAM 205 and appropriately reflected in the management data area 2041 of the NAND memories 204A to 204H.

The compression processing module 2032 includes a function of compressing data and a function of expanding and restoring the compressed data. If a read request with respect to valid data in the NAND group moved to the compressed storage area 2046 is issued, the control module 203 expands and restores the stored data of the NAD group by means of the compression processing module 2032, stores the valid data that is requested to be read in the read cache 2053 of the DRAM 205 and then returns the same to the host apparatus.

If the read frequency (the data read frequency in the NAND group unit) with respect to data read in the above procedure and provided in the NAND group moved to the compressed storage area 2046 exceeds a predetermined value, the control module 203 expands and restores stored data of the NAD group by means of the compression processing module 2032 and rearranges all of the valid clusters other than invalidated clusters in the compaction buffer area 2045. Since the NAND group allocated as the compaction buffer area 2045 is moved to the main storage area 2043 when it becomes full, an efficient data moving process from the compressed storage area 2046 to the main storage area 2043 can be realized by the above data rearrangement.

Further, if a process of updating data in the NAND group moved to the compressed storage area 2046 is performed, the data is invalidated and updated data is newly written to the primary buffer area 2042 of the SSD 12 that is a storage device of a type to additionally write data as described previously. When the amount of invalidated data in the NAND group moved to the compressed storage area 2046 exceeds a present amount, the control module 203 causes the compression processing module 2032 to expand and restore stored data of the NAND group and rearrange all of the valid clusters other than the invalidated clusters in the compaction buffer area 2045. It becomes possible to effectively use the NAND memories 204A to 204H by the rearrangement.

The NAND group allocated to the compressed storage area 2046 is returned to the free group area 2044 when valid data items of all of the NAND groups moved to the internal portion thereof (after the stored data is compressed) are rearranged in the compaction buffer area 2045.

Figure 6:
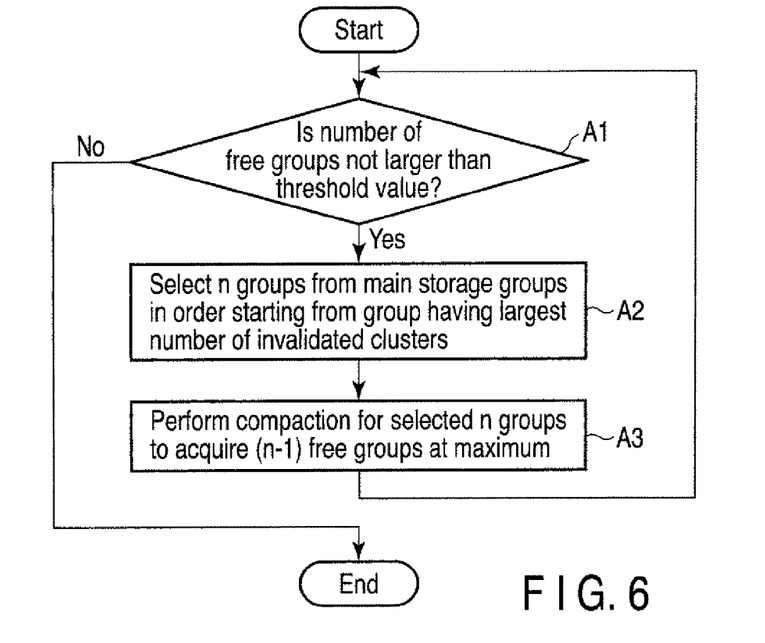
FIG. 6 is an exemplary flowchart for illustrating the operation procedure to securely acquire free groups by a compaction process performed by an SSD installed in the computer of the embodiment.

FIG. 6 is an exemplary flowchart for illustrating the operation procedure to securely acquire free groups by a compaction process performed by the control module 203 of the SSD 12.

When the number of free NAND groups which is remaining as the free group area 2044 and is set in an unused state becomes smaller than or equal to a predetermined number (YES in block A1), the control module 203 selects n NAND groups in an order starting from a group having the largest number of invalidated clusters from the NAND groups of the main storage area 2043 (block A2). Then, it performs a compaction process of rearranging valid clusters scattered in the selected NAND groups in n−1 or fewer NAND groups to acquire N−1 free NAND groups at maximum (block A3).

Figure 7:
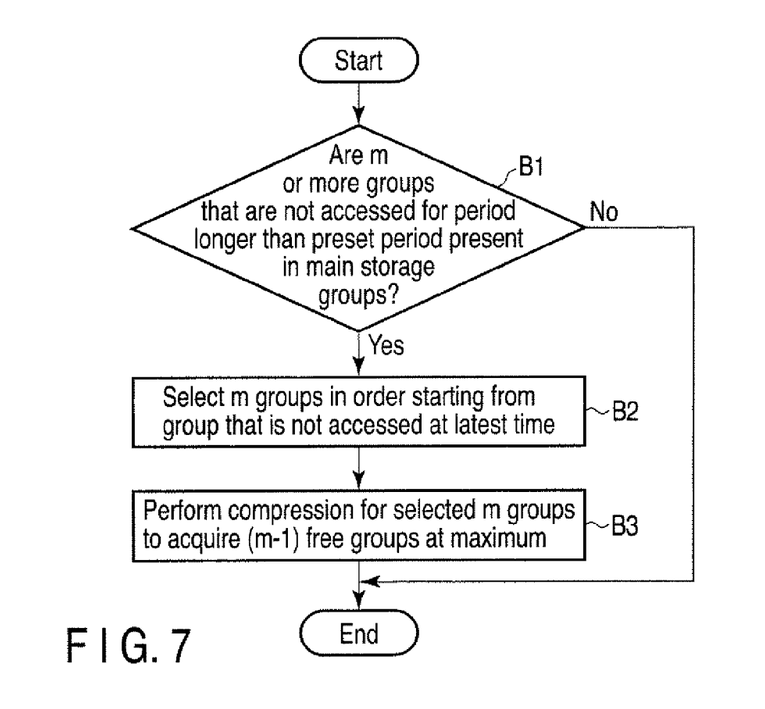
FIG. 7 is an exemplary flowchart for illustrating the operation procedure to securely acquire free groups by a compression process performed by an SSD installed in the computer of the embodiment.

FIG. 7 is an exemplary flowchart for illustrating the operation procedure to securely acquire free groups by a compression process performed by the control module 203 of the SSD 12. For example, the control module 203 performs the process shown in FIG. 7 for each predetermined period.

When the m or more NAND groups that are not accessed for a period longer than a predetermined period are present in the NAND groups of the main storage area 2043 (YES in block B1), the control module 203 selects m NAND groups in an order starting from a group that is not accessed at the latest time (block 82). Then, it compresses stored data of the selected NAND groups to acquire m−1 free NAND groups at maximum (block B3).

Figure 8:
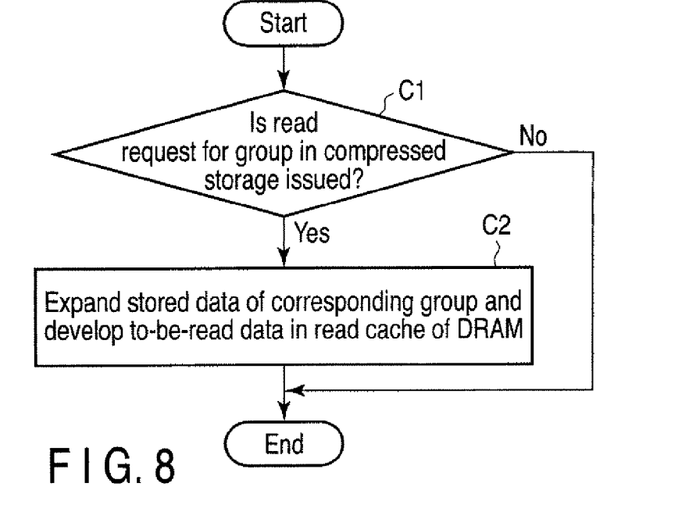
FIG. 8 is an exemplary flowchart for illustrating the operation procedure of a compressed data read process performed by an SSD installed in the computer of the embodiment.

FIG. 8 is an exemplary flowchart for illustrating the operation procedure of a compressed data read process performed by the control module 203 of the SSD 12.

When a read request for compressed valid data is issued (YES in block C1), the control module 203 expands stored data of the NAND group and develops to-be-read data in the read cache 2053 of the DRAM 205 (block C2).

Figure 9:
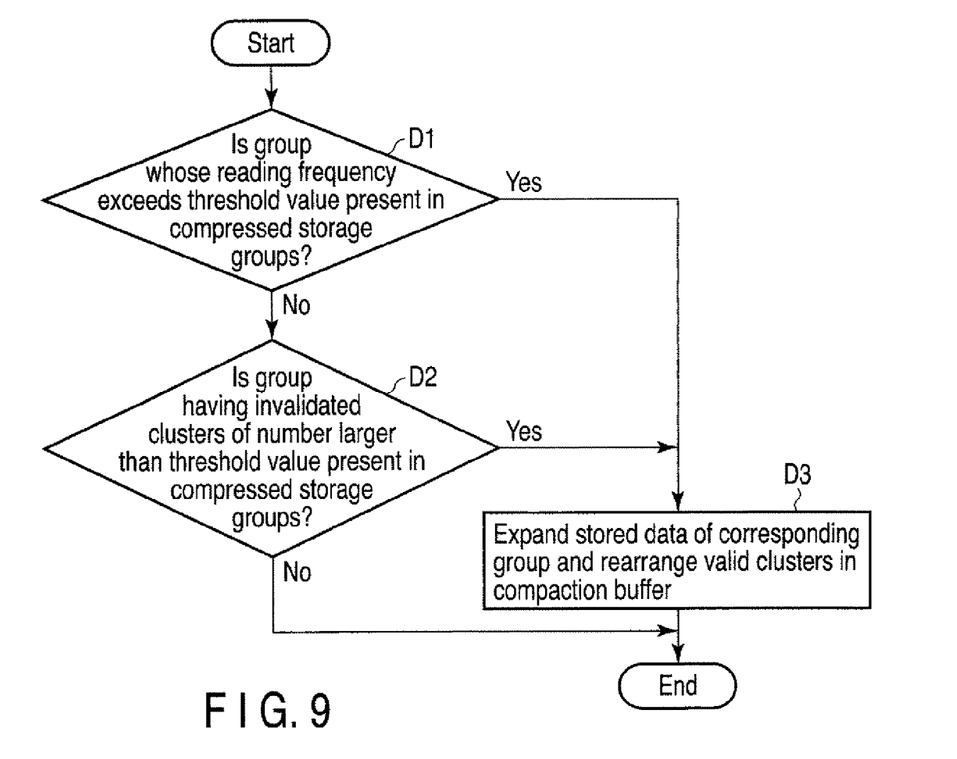
FIG. 9 is an exemplary flowchart for illustrating the operation procedure of a compressed data restoring process performed by an SSD installed in the computer of the embodiment.

FIG. 9 is an exemplary flowchart for illustrating the operation procedure of a compressed data restoring process performed by the control module 203 of the SSD 12.

When a NAND group whose read frequency exceeds a predetermined number is present in the NAND groups in the compressed state (YES in block D1), the control module 203 expands stored data of the NAND group and rearranges valid clusters in the compaction buffer area 2045 (block D3). Further, when a NAND group having invalidated clusters of a number larger than a predetermined number is present in the NAND groups in the compressed state (YES in block D2), the control module 203 expands stored data of the NAND group and rearranges the valid clusters in the compaction buffer area 2045 (block D3).

As described above, in the SSD 12, occurrence of compaction is suppressed and the write efficiency is maintained by compressing data that is not accessed for a long period to acquire a vacant storage area.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A nonvolatile semiconductor memory drive of a type in which data is additionally written, the memory drive comprising:
   a nonvolatile semiconductor memory arranged as a plurality of groups, each of the plurality of groups consisting of a plurality of pages, each of the plurality of pages comprising at least one cluster used as a data management unit; and
   a controller coupled to the semiconductor memory, the controller configured to control a process of writing and reading data with respect to the nonvolatile semiconductor memory, the controller comprising:
      a compaction module configured to acquire free groups by rearranging valid data scattered in n groups in groups of a number not larger than n−1 when the number of free groups remaining in a plurality of groups becomes not larger than a predetermined number, wherein the valid data being rearranged is in a unit of clusters, and a compression module configured to acquire free groups in order to suppress an execution opportunity of the compaction module, by compressing data stored in m groups in which access to valid data stored therein has not been made for a period longer than a predetermined period, and rearranging the compressed data in groups of a number not larger than m−1, wherein data being compressed is in a unit of groups, the compression module further decompresses the compressed data and rearranges the decompressed data when a read frequency with respect to valid data in a group set in a state in which the stored data is compressed and rearranged together with stored data of another group exceeds a predetermined number.

2. The nonvolatile semiconductor memory drive of claim 1, further comprising a cache memory coupled to the controller, wherein the compression module of the controller decompresses the compressed data that is requested to be read and stores the decompressed data in the cache memory when a read request of valid data in a group set in a state in which the stored data is compressed and rearranged together with stored data of another group is issued.

3. A nonvolatile semiconductor memory drive of a type in which data is additionally written, the memory drive comprising:

a nonvolatile semiconductor memory arranged as a plurality of groups, each of the plurality of groups consisting of a plurality of pages, each of the plurality of pages comprising at least one cluster used as a data management unit; and a controller coupled to the semiconductor memory, the controller configured to control a process of writing and reading data with respect to the nonvolatile semiconductor memory, the controller comprising:

a compaction module configured to acquire free groups by rearranging valid data scattered in n groups in groups of a number not larger than n−1 when the number of free groups remaining in a plurality of groups becomes not larger than a predetermined number, wherein the valid data being rearranged is in a unit of clusters, and a compression module configured to acquire free groups in order to suppress an execution opportunity of the compaction module, by compressing data stored in m groups in which access to valid data stored therein has not been made for a period longer than a predetermined period, and rearranging the compressed data in groups of a number not larger than m−1, wherein data being compressed is in a unit of groups, the compression module further decompresses the compressed data and rearranges the decompressed data when capacity of invalidated data in a group set in a state in which the stored data is compressed and rearranged together with stored data of another group exceeds a predetermined value.

4. The nonvolatile semiconductor memory drive of claim 1, wherein the compression module of the controller removes groups in which a compression ratio of stored data is not higher than a predetermined value from to-be-rearranged objects.

5. An information processing apparatus comprising:

a main body device; and a nonvolatile semiconductor memory drive of a type in which data is additionally written, the memory drive comprising a nonvolatile semiconductor memory arranged as a plurality of groups, each of the plurality of groups consisting of a plurality of pages, each of the plurality of pages comprising at least one cluster used as a data management unit, wherein the main body device comprises a data access request module configured to issue a data access request for the nonvolatile semiconductor memory to the nonvolatile semiconductor memory drive, wherein the nonvolatile semiconductor memory drive further comprises a controller coupled to the semiconductor memory, the controller configured to control a process of writing and reading data with respect to the nonvolatile semiconductor memory, wherein the controller of the nonvolatile semiconductor memory drive comprises:

a compaction module configured to acquire free groups by rearranging valid data scattered in n groups in groups of a number not larger than n−1 when the number of free groups remaining in a plurality of groups becomes not larger than a predetermined number, wherein the valid data being rearranged is in a unit of clusters, a compression module configured to acquire free groups in order to suppress an execution opportunity of the compaction module, by compressing data stored in m groups in which access to valid data therein has not been made for a period longer than a predetermined period, and rearranging the compressed data in groups of a number not larger than m−1, wherein data being compressed is in a unit of groups, a control module configured to interrupt free group acquisition process by the compression module when a data access request for the nonvolatile semiconductor memory is issued from the main body device while the free group acquisition process by the compression module is being performed, and wherein the compression module decompresses the compressed data and rearranges the decompressed data when a read frequency with respect to valid data in a group set in a state in which the stored data is compressed and rearranged together with stored data of another group exceeds a predetermined number.

6. A management method of managing a storage area in a nonvolatile semiconductor memory drive of a type in which data is additionally written, the memory drive comprising a nonvolatile semiconductor memory arranged as a plurality of groups, each of the plurality of groups consisting of a plurality of pages, each of the plurality of pages comprising at least one cluster used as a data management unit, and a controller coupled to the semiconductor memory, the controller configured to control a process of writing and reading data with respect to the nonvolatile semiconductor memory, the method comprising:

acquiring free groups by rearranging valid data stored in n groups in groups of a number not larger than n−1 when the number of free groups remaining in a plurality of groups becomes not larger than a predetermined number, wherein the valid data being rearranged is in a unit of clusters; and in order to suppress an execution opportunity of the acquiring of free groups by rearranging valid data, acquiring free groups by compressing data stored in m groups in which access to valid data stored therein has not been made for a period longer than a predetermined period and rearranging the compressed data in groups of a number not larger than m−1, wherein the data being compressed is in a unit of groups, and wherein the acquiring free groups by compressing data comprises decompressing the compressed data and rearranging the decompressed data when a read frequency with respect to valid data in a group set in a state in which the stored data is compressed and rearranged together with stored data of another group exceeds a predetermined number.

* * * * *